United States Patent
Cheng

(10) Patent No.: US 7,188,116 B2
(45) Date of Patent: Mar. 6, 2007

(54) METHOD AND APPARATUS FOR DELETING DATA IN A DATABASE

(75) Inventor: Qi Cheng, North York (CA)

(73) Assignee: International Business Machines Corporation, Armonk, NY (US)

(*) Notice: Subject to any disclaimer, the term of this patent is extended or adjusted under 35 U.S.C. 154(b) by 424 days.

(21) Appl. No.: 09/948,187

(22) Filed: Sep. 7, 2001

(65) Prior Publication Data

US 2002/0095408 A1 Jul. 18, 2002

(30) Foreign Application Priority Data

Nov. 24, 2000 (CA) .................... 2326805

(51) Int. Cl.
*G06F 17/30* (2006.01)
(52) U.S. Cl. ...................... 707/101; 707/102
(58) Field of Classification Search .......... 707/1–10, 707/100–104.1, 101, 102, 201, 200–206; 709/246
See application file for complete search history.

(56) References Cited

U.S. PATENT DOCUMENTS

| 5,133,068 | A | * | 7/1992 | Crus et al. ................. 707/100 |
| 5,226,158 | A | | 7/1993 | Horn et al. |
| 5,787,442 | A | | 7/1998 | Hacherl et al. ............. 707/201 |
| 6,161,147 | A | | 12/2000 | Snyder et al. |
| 6,560,592 | B1 | * | 5/2003 | Reid et al. ..................... 707/2 |
| 6,560,598 | B2 | * | 5/2003 | Delo et al. ..................... 707/4 |
| 6,820,135 | B1 | * | 11/2004 | Dingman et al. ........... 709/246 |

FOREIGN PATENT DOCUMENTS

| EP | 0351210 | 1/1990 |
| WO | WO 00/80453 | 10/2000 |

* cited by examiner

*Primary Examiner*—Yicun Wu
(74) *Attorney, Agent, or Firm*—Sawyer Law Group LLP

(57) ABSTRACT

The present invention is directed to a method and system for deleting data in a database The method and system is configurable, extensible and adaptable to the changing structure of a database to provide a desired deletion. The method and system includes storing at least one criteria for specifying data to be deleted, accessing the at least one criteria, and identifying tables in a family of tables referencing data associated with the one criteria, wherein each table is associated with at least one delete rule. The method and system further includes performing a delete function on the data associated with the one criteria in the tables according to the at least one delete rule associated with each table.

29 Claims, 11 Drawing Sheets

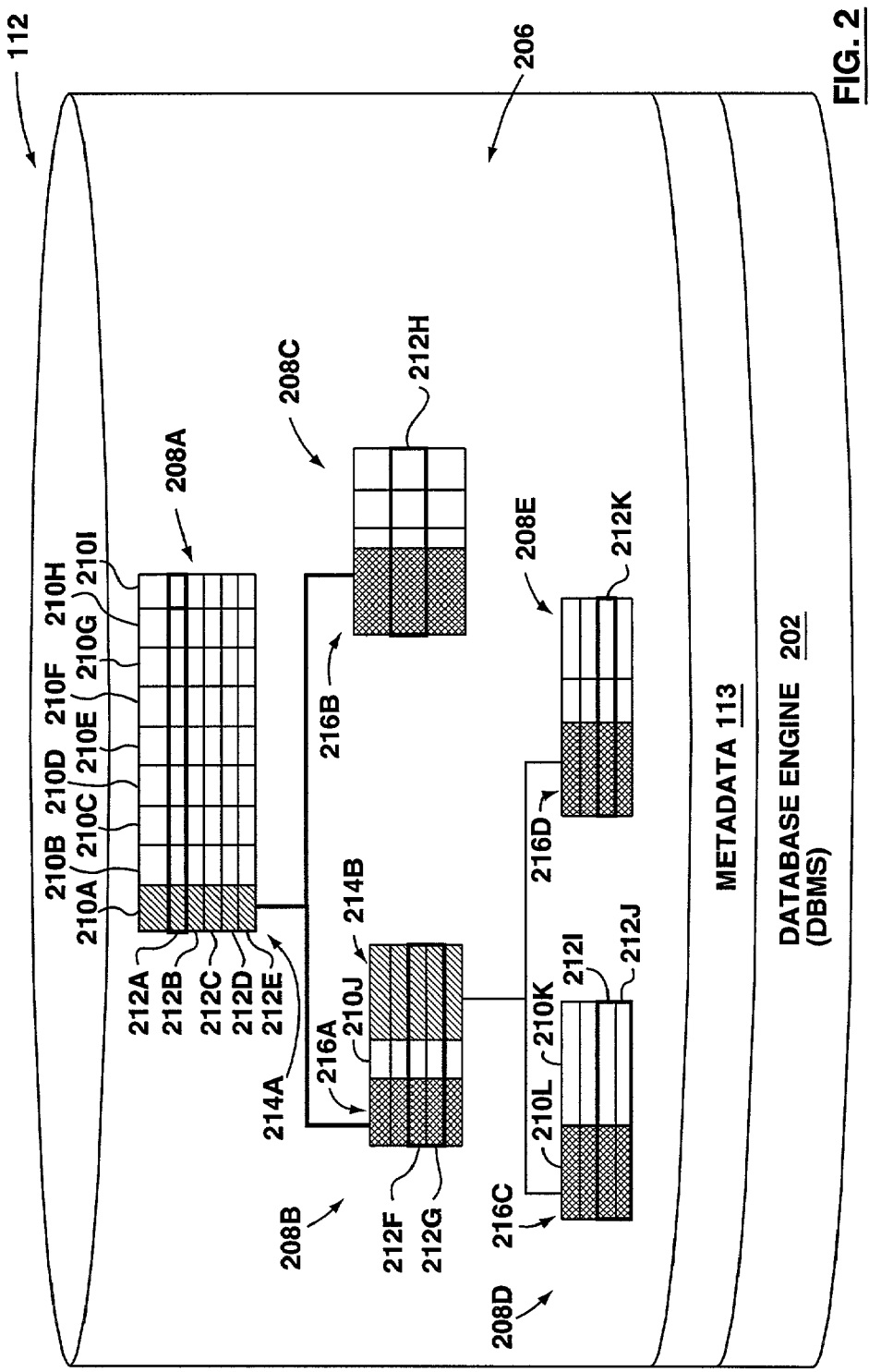

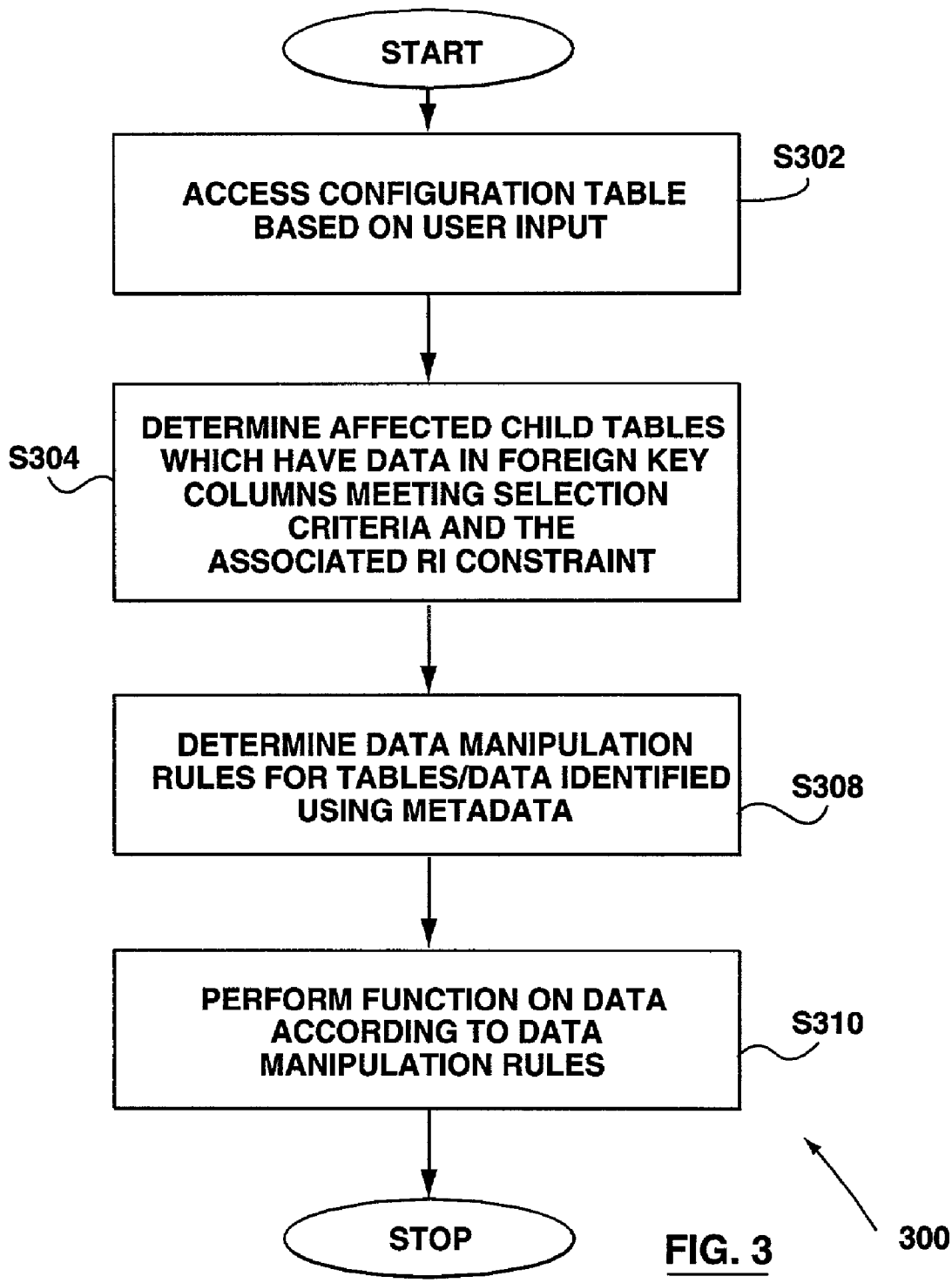

| TAB NAME | TYPE | CONDITION | NAME ARG | DAYS ARG |
|---|---|---|---|---|
| 208A | 1 | "where 210A = ___" | T | F |
| 208A | 2 | "where 210J < ___" | F | T |
| 208D | 1 | "where 210L = ___ and 210K > ___" | T | T |
| | | | | |

FIG. 3A

```
public boolean cleanTable() {
    get command line argument for the table to be cleaned up into table;         ⎫
    get command line argument for the clean type to be done on this table into   ⎬ S402
type;
    get name argument and days argument from command line into nameArg and       ⎭
the daysArg;

get command line argument for log level into log level;

get command line argument for force option into force-option;

get condition from the configuration table for this table and this type and keep ~ S404
the
    condition in whereClause;  ⎯ S406
    if (get condition fail)    ⎫
    {                          ⎬ S408
        error handle;          ⎪
        return false;          ⎭
    } get the information whether the condition using name argument or days        ⎫
argument
    from the configuration table;                                                ⎬ S410
    check if name argument and day argument are given in command line as asked   ⎭
in
    condition;
    if ( asked arguments are not given in command line)   ⎫
    {                                                     ⎪
    error handle;                                         ⎬ S412
    return false;                                         ⎪
    }                                                     ⎭ if ((loglevel is 0 or 1)AND force option is NO) ⎯ S420                       ⎫
    { // do top-down cleanup                                                     ⎪
            query = "DELETE FROM";     ⎫                                         ⎪
            query = query + table;     ⎬ S422                                    ⎪
            query = query + " " + where clause;  ⎭                               ⎪
                                                                                 ⎪
        try{                                          ⎫                          ⎬ S416
            prepare the query;                        ⎪                          ⎪
            setting the name argument and day argument; ⎬ S424                   ⎪        ⎫
            execute query;                            ⎭                          ⎪        ⎪
        } catch (SQLException e) {  ⎫                                            ⎪        ⎪
            error handle;           ⎬ S426                                       ⎪        ⎬ S414
            return false;           ⎭                                            ⎪        ⎪
        }                                                                        ⎪        ⎪
        return true                                                              ⎭        ⎪
    }                                                                                     ⎪
    else                                                                                  ⎪
                                                                                          ⎪
    { // we will use bottom up delete mode, delete recursively                            ⎪
                                                                                          ⎪
        dbcstatus = recursiveDeleteTables(whereClause, true, table);  ⎫                   ⎪
        return dbcstatus;                                             ⎬ S418              ⎪
    }                                                                 ⎭                   ⎭
                                   FIG. 4              ⎯ S302
```

```
                    //call constructWhere to map the delete condition to childTable
      based on     //constName and keep the result in childWhereClause;
                     childWhereClause = constructWhere(table, childTable, constName,
                     hashRow);
                     if (childWhereClause == null)    S700              S522
                   { //get childWhereClause faile
                       error handle
                       return false
                   }
                                                  S800                       S516
                          //check delete rule for this constraint;
                S524   deleteRule = checkDeleteRule (table, childTable, constName);
                     if (deleteRule == null)
                     { //get deleteRule failed                              S506
                       error handle
       S520        {   return false
                     }
                S526   if (the delete rule for the constraint is delete restrict
                          && forceOption is no)
                     { // delete restrict is specified and no force option
                           error handle;
                           return false;
                     }
                       else if (the delete rule is set null)
                       {
                S528      set the foreign key to null for all relative rows in the child table;
                       }
                       else
                S530   {
                          dbcstatus = recursiveDeleteTables(childWhereClause, false,
       childTable);
                            if (dbcstatus == false)
                            {
                               error handle;
                               return false;
                            }
                          }
                S532   }//end of for
                        delete the current row from the parent table;
                       }//end of while
                     } Catch (SQLException e) {
                           error handle;
                           return false;
                       return true;
                                              S508           FIG. 5B
```

```
public boolean getChildTables(String parentTable, Vector childTables) {

If (db Is DB2)
    {
        query = "SELECT tabname, constname
                FROM syscat.references
                WHERE reftabname =";                                    } S602
        query = query +""""+ parentTable. Trim ().toUpperCase() + """";
    }
    else If (db Is Oracle)
    {
        query = "SELECT c.table_name as tabname, c.const raint_name as constname FROM dba_constraints p, dba_constraints c
                WHERE c.constraint_type = 'R' AND c.r_owner =p.ownor    } S604
                AND c.r_constraint_name = p.constraint_name
                AND p.table_name =";
        query = query + """" + parentTable. Trim ().toUpperCase() + """"
    }
    else
    {
        error handle;
        return false;         S606
    } try {
                                                    S608
        execute the query and keep the result in rs
        while (rs.getNextRow( ))
        {                           S610
            get tabname;         S612
S616        get constraint name;                        S614
            add tabname and constraint name to childTables;
        }
        } catch (SQLException e) {
            error handle;
            return false;
        }
                                                        S600
    return true;
```

FIG. 6

```
public String construct Where (String table, String childTable, String constName,
Hashtable row)
{
    whereClause = "where ";

if (db is DB2)
    {
        try {
            query = "SELECT colcount, tk_colnames, pk_colnames
                    FROM syscat.references
                    WHERE reftabname = '";
            query = query + ""''"+ table.trim().toUpperCase() + "''"
                    + "AND tabname = " + "''"
                    + childTable.trim().toUpperCase() + "''"
                    + "AND constName = " + "''"
                    + constName.trim().toUpperCase() + "''";
            execute query and keep result in rs1;
            while (rs1.getNextRow())
            {//rs 1 has one row only
                get colcount;
                get tk_colnames;
                get pk_colnames;

while ( colcount > 0)
                {
                    whereClause = whereClause + next token in fk_colnames + "="
                                  + row.getValue(next token in pk._colnames);
                    whereClause = whereClause + " AND ";
                    colcount--;
                }
                trun cut the last AND in whereClause;
            }
        } catch (SQLException e) {
            error handle;
            return null;
        }
    }
}
```

```
            else if ( db is Oracle)
            {
                try {
                        query = "SELECT p.constraint_name as pconstname
                            FROM dba_constraints p, dba_constraints c
                            WHERE c.r_owner = p.owner
                                    AND c.r_constraint_name = p.constraint_name
                                    AND p.table_name = " ;
                        query = query + "'" + table.trim ().toUpperCase() + "'"
                                + "AND c.table_name = " + "'"+
childTable.trim ().toUpperCase()
                                + "'" + " AND c.constraint_name = " + "'"
                                + constName.trim()toUppercase() + "'";

execute query and keep result in rs1;
                        while (rs1.getNextRow( ))
                        { // rs1 has one row only
                                get pconstname;
                        }
                        query = "SELECT column_name, position
                            FROM dba_cons_columns
                            WHERE constraint_name = ";
                        query = query + "'" + pconstname.trim().toUpperCase() + "'"
""                              + " AND table_name = " + "'" + table.trim().toUpperCase() +

+ " ORDER BY position";
                        execute query and keep result in rs1;
                        query = " SELECT column_name, position
                            FROM dba_cons_columns
                            WHERE constraint_name = ";
                        query = query + "'" + constName.trim().toUpperCase() + "'"
                                + AND table_name = "+ "'"
                                + childTable.trim).toUpperCase() + "'"
                                + " ORDER BYposition ";
                        execute query and keep result in rs2;

while (rsl.getNextRow( ) && rs2.getNextRow( ))
                        {
                            whereClause = whereClause + rs2.getString("column_name")) +
"="
                                        + row.getvalue(rs1.getString("column_name"));
                            whereClause = whereClaus + " AND ";
                        }
                        trun cut the last AND in whereClause;
                } catch (SQLException e) {
                        error handle;
                        return null;
                }
            }
        }
        if (whereClause.length() <= 6)
        {
            whereClause = null;
        }
        return whereClause;
}
```
⎫
⎬ S710
⎭

FIG. 7B

```
public char checkDeleteRule(String table, String childTable, String constName) { if (db is DB2)
    {
        query = "SELECT deleterule FROM syscat. references WHERE tabname
 = ";
        query = query + "'" + childTable.trim()toUpperCase() + "'";
        query = query + " AND reftabname = " + "'"
                + table.trim ().toUppercase() + "'";
        query = query + " AND constName = " + "'"
                + constName.trim ().toUppercase() + "'";
    }                                                                  } S802
    else if (db is Oracle)
    {
        query = "SELECT delete_rule as deleterule
                FROM dba_constraints
                WHERE constraint_name = ";                              } S804
        query = query + "'" + constName.trim().toUpperCase() + "'";
        query = query + " AND table_name  = " + "'"
                + childTable.trim().toUppercase() + "'";

}
    else
    {
        error handle;
        return null;
    } try {
        execute the query and keep the result in rs;
        while (rs.getNextRow())                                         } S806
        { // rs has one row only
            get deleterule into deleteRule;
        }
    } catch (SQLException e) {
        error handle;
        return null;
    }
    return deleterule;
}
```

METHOD AND APPARATUS FOR DELETING DATA IN A DATABASE

CROSS-REFERENCE TO RELATED APPLICATIONS

This application claims benefit under 35 USC 119 of Canadian Application 2,326,805, filed on Nov. 24, 2000.

FIELD OF THE INVENTION

The present invention relates to the care and maintenance of databases and, more particularly, to methods and apparatus for deleting data in a database.

BACKGROUND OF THE INVENTION

During the past several years, there has been an increase in the use of databases. A large part of the increase is due to the increased development and use of electronic commerce (E-commerce) services.

E-commerce has developed tremendously during the past few years due to the explosive and widespread use of the Internet and, in particular, the World Wide Web. Due to the relatively low costs of developing web sites with E-commerce features, many new companies have been created to exploit the features and capabilities of the "new economy" and specifically E-commerce. Older, more traditional companies are also expanding to the World Wide Web to provide E-commerce services. As a consequence, the use and requirements of databases by web service providers is increasing and continually evolving.

This rapid rate of use and evolution of databases has resulted in many databases undergoing continual modification as a company's business model changes, new E-commerce features are developed, customer needs change, or the focus of the business using the database changes. Additionally, many businesses, while developing their E-commerce applications, are continually refining, re-defining and generally changing the services that will need to be supported by their databases. Consequently, the applications and the underlying database tables that are being developed by these companies to support their E-commerce needs are in a constant state of flux. As a result, databases are constantly in need of maintenance. This maintenance may require the removal or deletion of unwanted data. However, the tools available to support the maintenance and cleanup of databases have been less than satisfactory.

Many of the maintenance tools available today must be specifically designed for each table that forms part of a larger database. Since commercial databases may literally comprise, and require the development, of hundreds and sometimes thousands of custom tables, the effort required to support maintenance in such a custom configuration and/or development is extremely onerous. With many present database maintenance tools, specific routines are often coded or written for each table that is to be maintained, such as, deletion of data that is older than a specified period and deletion of particular customers, for example. The source code for these specific routines is difficult to maintain. Additionally, when a table in a database is modified such as, for example, a change in the name of a table or column, a change in a referential integrity (RI) relationship, or a change in data deletion rules (e.g., delete rules) when an RI constraint is changed, the source code for a maintenance tool affected by the change will also need to be modified and re-compiled. Additionally, as the number of tables in a database increases, the complexity and maintainability of database maintenance tools also increases. Thus, the task of developing a custom data maintenance tool for frequently changing database tables can be overwhelming, time consuming and costly.

Accordingly, it would be desirable to provide database maintenance tool which is easily customized and which can adapt to constantly changing database tables.

SUMMARY OF THE INVENTION

A method and system for deleting data in a database is disclosed. The method and system is configurable, extensible and adaptable to the changing structure of a database to provide a desired deletion. The method and system includes identifying data associated with a criteria and identifying tables in a family of tables having said data associated with said criteria. The method and system further includes performing a delete function on said data associated with the criteria, in said tables in said family of tables, according to delete rules of said table with which said data is associated.

Advantageously, embodiments of the present invention provide a database maintenance tool that is configurable, extensible and adaptable to the (sometimes) rapidly changing structure of a database, because it has the ability to identify tables affected and apply delete rules specific to certain data. The maintenance tool is configurable in the way data is deleted, extensible to new tables and adaptable to changes in the database as the database develops, and is adaptable to changes to the database structure (or schema) without requiring customization (i.e., through custom programming).

BRIEF DESCRIPTION OF THE DRAWINGS

FIG. 2 is a schematic illustration of a portion of the database server of FIG. 1;

FIG. 3 is a flowchart of the operations performed by a portion of the database server of FIG. 1;

FIG. 3A is a tabular representation of a configuration table used by the database server during the operations illustrated in FIG. 3;

FIG. 4 is, in pseudo-code, listing of instructions performed by the database server of FIG. 1 for implementing a first portion of the operations illustrated in FIG. 3;

FIGS. 5A & 5B are a pseudo-code listing of instructions performed by the database server of FIG. 1, for implementing a second portion of the pseudo-code of FIG. 3;

FIG. 6 is a pseudo-code listing of instructions performed by the database server of FIG. 1, for implementing a first portion of the pseudo-code of FIG. 5;

FIGS. 7A & 7B is a pseudo-code listing of instructions performed by the database server of FIG. 1, for implementing a second portion of the pseudo-code of FIG. 5; and FIG. 8 is a pseudo-code listing of instructions performed by the database server of FIG. 1, for implementing a third portion of the pseudo-code.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Throughout the description references are made to function calls and variables. Function calls, in addition to a unique name, are identified by underscoring while variables are identified using "quotes". Further, in the exemplary embodiments described herein, pseudo-code is illustrated using, in part, Structured Query Language (SQL).

Figure 1:
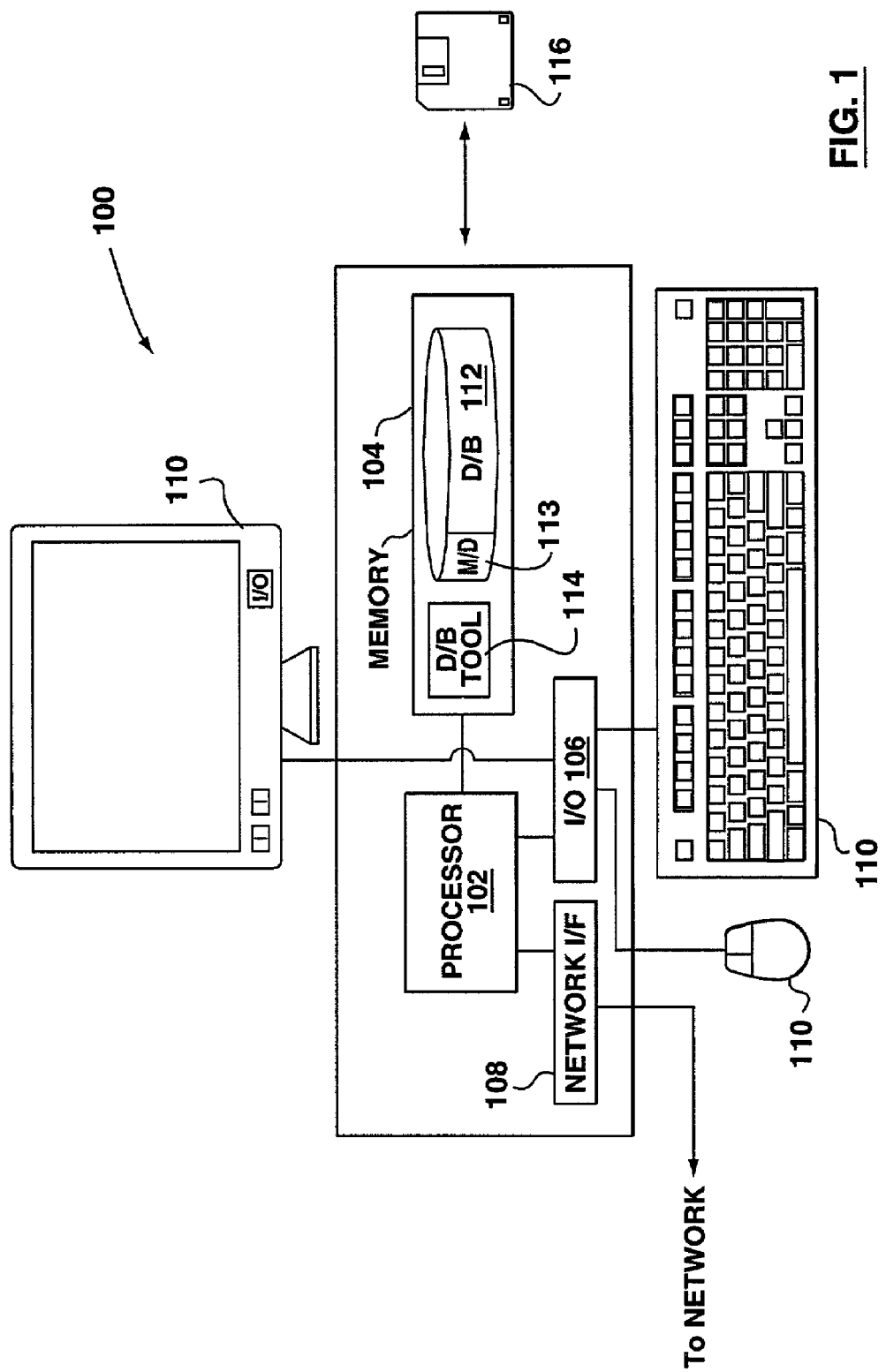
FIG. 1 is a schematic illustration of a database server embodying aspects of the present invention.

Illustrated in FIG. 1 is a computer system according to a first embodiment of the invention which is configured as a database (DB) server 100. The computer system comprises a processor circuit 102 which is operable to access a database for storing data in a family of tables. The processor circuit 102 is also operable to perform a delete function on data associated with criteria in tables in the family of tables, according to delete rules of a table with which the data is associated.

The processor circuit 102 may include, for example, a central processing unit (CPU) of the computer system, which interacts and interfaces with memory 104, input/output (I/O) peripheral support card 106 and a network interface card 108 of the computer system. The I/O peripheral support card 106 interfaces with conventional I/O devices 110 such as a keyboard, mouse and/or display which act as user interface devices. Other I/O devices which are not shown may also be supported as is known by those of ordinary skill in the art.

The DB server 100 may also receive or load instructions from processor readable media such as portable storage media 116. Storage media 116 may be, for example, a diskette, CD-ROM, magnetic or optical carrier, a remote device (such as a networked data storage device) or the like.

DB server 100 may be a standalone device interacting with only one user or, alternatively, may be network enabled. A network enabled DB server 100 may be accessed by many users and be used to support many applications such as E-commerce applications, web sites, corporate data, etc. The DB server 100 may include several network enabled computing devices interacting to support one or more databases.

The processor circuit 102 may be any central processing unit (and any necessary supporting chips) suitable for performing the operations described herein. An Intel Pentium™ class processor, a Reduced Instruction Set Computer (RISC) chip or the like are likely suitable for most operating environments. Additionally, and as will be appreciated by those of ordinary skill in the art, one or more CPUs may be employed to act co-operatively as a processor circuit. Hereinafter processor circuit 102 will be referred to as processor 102.

Memory 104 may include both volatile (e.g., RAM, Flash, for example) and non-volatile media such as hard discs, Zip™ disks, magnetic tapes, optical discs, for example. Memory 104 is readable by the processor circuit to provide instructions for implementing an operating system such as IBM AIX, Microsoft Windows NT, 98 or 2000 ME, for example. In this embodiment, the memory 104 holds a database (DB) 112 and a database maintenance tool 114 maintained by the processor circuit 102. The DB 112 may be under development or modified, as required, from time to time and thus may require maintenance by the database maintenance tool 114.

DB 112 includes both database management software (DBMS) referred to as a database engine 202 such as the commercially available DB2™ from IBM Corp. or Oracle database available from Oracle Corp., and tables and data stored in families of tables created by the DBMS. As will be appreciated by those of ordinary skill in the art, DB 112 may be a custom designed or commercially available database (such as those identified above). Also forming part of DB 112 are metadata tables 113 also known as a system catalog, which are created and maintained by the DBMS to hold data about the structure and schema of the database created through operation of the DBMS, and rules for deletion of data by the database maintenance tool 114.

The maintenance tool 114 is comprised of codes, code segments or processor readable instructions operable to direct the processor circuit 102 to perform a delete function on data associated with a specified criteria from the family of tables in the database, according to deletion rules associated with respective tables in the family of tables. Code segments for directing the processor circuit 102 to carry out this function may be provided to the processor circuit 102 in a computer data signal embodied in a carrier wave, or received from a communication network which may include the Internet, for example. Alternatively, or in addition, these code segments may be provided to the processor circuit 102 via a portable medium such as the storage media 116 shown in FIG. 1.

Similar to the database 112, the DB maintenance tool 114 may be hosted by separate computing devices which interact via a communications link using, for example, a public or private network or a dial up connection.

Database

DB 112 is illustrated in greater detail in FIG. 2. As indicated above, DB 112 includes the DB engine 202, metadata tables 113 and a family data tables shown generally at 206.

In the exemplary illustration of FIG. 2, the family of data tables 206 include five tables 208 (208A–E). Tables 208 are sometimes referred to in the art as relations. Typically a table 208 will relate only to a single subject such as, for example, the address of a customer. Each table includes a number of columns 210. For example, table 208A includes nine columns 210A–210I. The columns in the customer example may include a unique customer identifier, street number, street name, suite number, district or prefecture, city, state or province, country and zip or postal code.

A table 208 (if not empty) will also have a number of data rows (or tuples) 212. In the customer table example, these rows would be associated with the address of each customer for which records are kept in the DB 112.

A column 210 may have associated characteristics often referred to as a key. For example, column 208A may require that each entry in column 210A (customer identifier) be unique. Alternatively, a column 210 for the street number may require each value or entry in this column be greater than zero. A column 210, which is required to uniquely identify only one row 212 in the table 208 (i.e., no two entries or records in this column can have the same value), is known as a primary key. Primary keys 214 are identified in FIG. 2 with hatching. A foreign key column 216 is a column 210 which relates one column in a first table to the primary key in a second table. In FIG. 2, foreign keys 216 are identified by cross-hatching. The table 208 associated with the foreign key 216 is a child table of table 208 (known as the parent table). Two related tables may be related by one or more primary/foreign key pairs.

In FIG. 2, table 208A has as its primary key 214A column 210A. Primary key 214A is associated with foreign key 216A in table 208B. In this relationship between table 208A and table 208B, table 208A is the parent table and table 208B is the child table. Table 208A is also the parent to child table 208C. Tables 208A and 208C are related by primary key 214A and foreign key 216B.

Table 208B also has a primary key 214B. Referencing primary key 214B are foreign keys 216C and 216D which form part of tables 208D and 208E, respectively. Consequently, table 208B, which is a child table to table 208A, is also a parent table to tables 208C, 208D. It will be appreciated that the tables are arranged in a hierarchical referential relationship within the family of tables. Table 208A is the top most table in the family of data tables 206 and this is in a higher position in the hierarchical relationship than tables below which are in lower positions in the hierarchical relationship, such as tables 208C, 208D and 208E which are the lower most tables (since tables 208C, 208D and 208E do not have any associated child tables).

A family of data tables 206 includes all those tables which are related to each other by a primary key/foreign key pair(s). While database 112 is illustrated as including a single family of data tables 206 (related to one another by several primary/foreign key pairs), database 112 may include several families of tables with each family of tables generally characterizing different aspects of a business' operation. For example, a first family of tables in database 112 may relate to customers, their orders, their accounts and the like. A second family of tables may relate to property and capital equipment owned by the business. A third family of tables may relate to human resources matters (e.g., employee names, earnings, pension data, etc.). As such, a single family of tables comprises a sub-set of all the tables which form part of the entire database 112.

The DB engine 202 operates to create and interact (e.g., perform queries, updates, deletes, index, etc.) with a family of data tables 206. The DB engine 202 also creates and maintains the metadata tables 113 which maintain data including the names of tables in the family of data tables 206, the names of columns (or fields) forming the tables, the identity of any foreign or primary keys 216, 214 that form part of a table such as data table 208, referential integrity rules, and delete rules.

Referential integrity rules are rules imposed on the data to maintain the table and data integrity. There are generally four types of data integrity rules: (a) entity or table integrity; (b) domain or value integrity; (c) referential integrity; and (d) user defined integrity. Entity integrity rules ensure that every row (or each entry in column) in a table is unique. Domain integrity rules refer to a condition that entries into a column must fall within a defined range (e.g., a date is between Jan. 1, 1900 and present, a street number is greater than zero, etc.). User defined integrity rules are defined by the user.

Of particular importance to the present invention are the referential integrity (RI) rules. Referential integrity rules ensure that a foreign key value points to, or references, valid rows in the parent or referenced table. Each primary/foreign pair relating two tables may be individually associated with a referential integrity rule or constraint. Many commercial DBMS allow tables to be defined such that the database engine 202 enforces the referential integrity constraints declared (rather than requiring a DBMS administrator to write or implement software code to implement this feature) with respect to inserts, updates and deletes. If the DB engine 202 used to implement this invention is either an IBM DB2 or Oracle database, it will have the built-in ability to enforce referential integrity automatically.

Generally, when a row is inserted into a child table, an entry into a column defined as a foreign key must reference a valid row or be set to null (if this latter value is acceptable). For example, where the foreign key in the child table and primary key in the parent table identify, uniquely, a customer identifier, an entry into the foreign key column of a child table must have a corresponding entry in the primary key column of the parent table. Additionally, a row in the primary key table cannot be deleted if the entry for the row in the primary key column is referenced by a child table unless the row in the child table is processed properly (e.g., deleted) based on the delete rule. Similarly, an entry in the primary key table cannot be updated if the entry in the primary key column is referenced by a child table. For example, if a request is made by a user to delete a customer identifier in the primary key column of the parent table, and the to-be-deleted value is referenced (or pointed to) in a child table, the referential integrity rules may require that this request for deletion be denied or the rows in the child table be processed properly (e.g., deleted) first. Otherwise, if the row in the parent table is deleted, the relationship between the parent and child tables (for entries in the child table that refer to the row being deleted) would be broken. This would result in a breakdown of the database.

Many databases typically provide for the enforcement of referential integrity rules using the following delete rules: (1) delete cascade; (2) delete set null; and (3) delete restrict.

Where delete cascade rules are followed, a user requesting that a row in a parent table be deleted, results in the database engine 202 deleting the row in the parent table, and any rows in child tables referencing the deleted row in parent table being deleted. Any rows deleted in the child table that are referenced by another child table are also deleted. This cascading deletion continues until no further child tables are affected. For example and referencing FIG. 2, assume that delete cascade is allowed and that row 212A in table 208A is referenced by rows 212F, 212G in table 208B and 212H in table 208C. Assume further that the rows 212F, 212G in table 208B referencing row 212A in table 208A are referenced by rows 212I, 212J in table 208D and row 212K in table 208E. A user requesting to delete row 212A will result in the deletion of row 212A of table 208A, rows 212F, 212G in table 208B, row 212H in table 208C, rows 212I, 212J in table 208D and row 212K in table 208E.

Delete set null rules are very similar to delete cascade rules. However, unlike delete cascade rules under which those rows in a child table referencing a deleted parent table are deleted, delete set null rules simply cause those entries in a foreign key column in a child table that reference a deleted row (or primary key entry that has been set to null) in a parent table to be set to a null value.

Delete restrict rules simply require that prior to an entry in a primary key column being deleted, rows in a child table that reference the to-be-deleted parent table entry are deleted first. Embodiments of the present invention enable the deletion of row 212A of table 208A, rows 212F, 212G in table 208B, row 212H in table 208C, rows 212I, 212J in table 208D and row 212K in table 208E where some or all of the tables have an associated delete restrict rule and the user has requested that row 212B be deleted.

DB Maintenance Tool

In general the database maintenance tool 114 performs a delete function on data associated with certain criteria, in tables in a family of tables, according to delete rules of a table with which the data is associated. In this embodiment the criteria for specifying the data on which the function is to be performed may be received at the processor circuit 102 and stored in a configuration table 340 of the type shown in FIG. 3A.

Referring to FIG. 3A the configuration table 340 is created by the database cleanup tool 114 and includes a column indicating names of tables that may be cleaned up—TABNAME 342; the type of clean up for an associated table that may be performed during operations 300—TYPE 344; the condition that is to govern this clean up type in the table stored in TABNAME 342—CONDITION 346; a boolean or other indicator indicating whether a string of text is required to be inserted into CONDITION 346 (if required by CONDITION 346)—NAMEARG 348; and a boolean or other indicator indicating whether a number value (indicating a time period in days) is required to be inserted into CONDITION 346 (if required)—DAYSARG 350. For each table/type pair stored in a cleanup table 340 there will be one condition stored.

The TABNAME 342 and TYPE 344 columns, together, are the primary key of configuration table 340. Both TABNAME 342 and TYPE 344 are, in the exemplary embodiment, columns of forty characters each. The TYPE 344 column is an indicator of the CONDITION (or criteria) which can be easily recalled by users of DB maintenance tool 114 to indicate the condition (stored in CONDITION 346) that is going to be used to perform the desired deletion.

CONDITION 346 (which, in the exemplary embodiment, is a column accepting character entries of up to 2048 characters) indicates the condition or arguments that are used to select data for deletion from the table specified in TABNAME 342. For example, an entry in CONDITION 346 may indicate that all entries in the table indicated by TABNAME 342 which are associated with XYZ Corp. are to be deleted from the table specified. Another example of an entry in CONDITION 346 is a condition selecting all data older than "n" days old. The value for "n" (a placeholder in an entry in CONDITION 346) is indicated as required by a TRUE value stored in DAYSARG 350. The value which is used for the placeholder "n" is provided by a user.

NAMEARG 348 stores boolean values which indicates whether arguments are to be inserted into the condition selected by a user. If a value is required to be inserted into an associated CONDITION 346, NAMEARG 348 is set to TRUE.

The DB maintenance tool 114 may include a program code segment which directs the processor circuit 102 to produce a user interface that enables the user to interact with the DB maintenance tool 114 to permit a user to specify conditions or values for conditions specified in the configuration table to define the criteria for selecting data on which the function is to be performed. The interface may include a command line interface or graphical user interface, for example, and enables a user to be presented with a user understandable representation of one or more pre-stored, frequently used conditions from the configuration table. An exemplary pre-stored condition (which will eventually form part of a complete SQL query) may specify that "data relating to a specified customer that is older than a specified amount of time" is to be deleted.

The user may also provide specific arguments or parameters which further define the data on which the function is to be performed when using the DB maintenance tool. In the above example, the user may specify the customer's name and the amount of time, for example.

Using the condition or criteria selected by the user (and any specified arguments), the DB maintenance tool 114 will then attempt to perform the delete function. Once the delete function has been performed, the user may, if desired, select another condition to perform another deletion of data meeting a different criteria. If the function requested has failed (e.g., the user requested a deletion using a top down delete and some of the affected data is associated with delete restrict), the user may, if desired, choose another cleanup or the same cleanup using another method of cleaning up the data (e.g., bottom up).

FIG. 3 is a flow chart describing the functionality of blocks of the code segment acting as the database maintenance tool 114. The processor circuit 102 performing the delete function will do so in accordance with the delete rules associated with the tables of the family of tables, as defined by the rules in the metatable 113.

Referring to FIG. 3, a method executed by the processor circuit 102 in response to the first code segment, for deleting data, according to this embodiment of the invention, is shown generally at 300. A first block of codes S302 directs the processor circuit 102 to access the configuration table 340 to identify the cleanup conditions that are to be used.

Block S304 then directs the processor circuit 102 to determine the child tables which contain data satisfying the criteria set by the user by querying metadata tables 113 maintained by DB engine 202 to determine the relationships between tables having data meeting the criteria set by the user. As each child table and the relationships between tables are determined, the referential integrity constraints for each primary/foreign key pair for these relationships are also determined. Affected child tables will include those tables that have foreign key entries (or data) which references primary key data that is to be cleaned up. Blocks S302 and S304 act in conjunction with the processor circuit 102 to provide means for identifying all of the affected data in the database which is associated with the criteria or condition set by the user. At the same time, the hierarchical referential relationship is identified, the family of tables holding the affected data is also identified.

Also using the identities of the identified tables, block S308 directs the processor circuit 102 to query the metadata tables 113 to identify delete rules that are associated with respective tables holding affected data. Each referential constraint of each table may be associated with a separate, individual rule. It should be noted that a single table may have more than one primary/foreign key pair that relates the child table to a parent table. As such, each table may have more than one referential integrity constraint. For example, although a family of tables 206 may include several tables 208A–208E (FIG. 2), the same delete rule need not apply to all of tables 208A–208E nor must the same delete rule apply to every referential integrity constraint for a selected table. For example, the referential integrity constraint associated with the primary/foreign key pair relating table 208A to table 208B (primary key 214A and foreign key 216A, respectively) may be subject to a cascade delete rule. However, the primary/foreign key pair relating table 208B to table 208D (primary key 214B and foreign key 216C, respectively), which is affected by the proposed deletion, may be subject to a delete restrict rule. As a result, if the proposed deletion also affects a child table to table 208B (i.e., either of tables 208D or 208E), then the data affected in tables 208D or 208E will need to be deleted prior to the data affected in tables 208A, 208B is deleted, for example.

Once the affected tables, referential integrity rules, and data deletion rules are determined for each affected table, block S310 directs the processor circuit 102 to perform a function on the data meeting the criteria according to delete rules of the table with which the data meeting the criteria is associated. If cascade deletes are allowed in every table affected (and a detailed log of the deletions performed on each of the affected tables is not required), then a top down delete or cleanup is appropriate. In every other situation, a bottom up deletion or cleanup is preferred, by deleting data from a table in a lower position in the hierarchical referential relationship between affected tables prior to deleting data from a table in a higher position in that relationship.

Once the cleanup has been performed (which may include the generation of a detailed log of activity), the method is finished. Block S310 in conjunction with the processor circuit 102 thus acts as means for deleting data associated with a criteria from tables in a family of tables according to delete rules of a table with which the data is associated.

Referring to FIG. 4, a pseudo-code implementation of block S302 of FIG. 3 is shown. Pseudo-code S402, directs the processor circuit to read the command line invoking the launching of the database maintenance tool described herein. For example, the following command line—"db-cleanuptool.exe—table 208A—type 1—name XYZ Inc.—loglevel 2—force_option Yes"—launches the DB maintenance tool 114 using the following command line arguments: (1) "208A" (the table name); (2) "1" (easy reference to a specific cleanup condition); (3) "XYZ Inc." (name arguments—if any are required); (4) "2" (a log level to indicate whether detailed logging of the transaction is required—"2" indicates that a detailed log is required; "0" indicates no log is required and "1" indicates that only a summary log is required); and (5) "YES" (a boolean indicator of whether the requested cleanup is attempt to perform the proposed deletion following the delete rules determined or, regardless, perform deletion requested by the user). It should be noted that in this particular example an argument for a period of time (indicated as required by a TRUE value in DAYSARG 350) is not illustrated. The name and day arguments will be stored temporarily in variables. A detailed log provides a detail of each transaction (i.e., deletion) performed on each table. A summary log provides an indication of whether the requested transaction was completed successfully.

Based on the parameters provided by the log level and the force option, DB maintenance tool 114 will attempt to perform a bottom up or top down deletion. The table below indicates the four possible combinations of the log level and force option parameters and the resulting type of deletion attempted.

| LOG LEVEL | FORCE OPTION | ATTEMPTED TYPE DELETION |
|---|---|---|
| 0 or 1 (Summary Log) | NO | TOP DOWN |
| 0 or 1 (Summary Log) | YES | BOTTOM UP |
| 2 (Detailed Log) | NO | BOTTOM UP |
| 2 (Detailed Log) | YES | BOTTOM UP |

The force option indicates whether the user, who may be unaware of the delete rules associated with any RI constraints, proposes to follow the delete rules and stop any proposed deletion if a delete restrict rule is encountered (force option NO) or to circumvent any delete restrict rule by forcing DB maintenance tool 114 to perform the proposed deletion despite any delete restrict rules encountered. For example, a user may specify a deletion that is to be performed, a detailed log be prepared (log level 2) and that any delete restrict rules are followed (force option NO). In this circumstance, as a detailed log generally requires a bottom up deletion to be performed, DB maintenance tool 114 will attempt to perform a bottom up cleanup. However, if, during identification of the affected tables, RI constraints and delete rules, a delete rule restrict is encountered, the force option NO specified by the user will cause the deletions performed to be "rolled back" (i.e., not committed), the proposed deletion terminated, and the detailed log indicating an unsuccessful deletion. However, if the user had requested the same deletion to be performed, with the same detailed log being created, but had specified a force option of YES, all affected data would be deleted (and committed if performed successfully) despite one or more RI constraints being encountered and associated with a delete restrict rule.

Using the table name (stored in a variable "table") and cleanup type (stored in a variable "type") to search columns TABNAME 342 and TYPE 344 of configuration table 340, respectively, pseudo-code S404 directs the processor circuit to locate an associated condition from CONDITION 346 in FIG. 3A and the associated boolean values in NAMEARG 348 and DAYSARG 350. The condition returned by the processor circuit is then stored in temporary variable "whereclause" as indicated by pseudo code S406. If, based on the command line launch of DB maintenance tool 114, an entry from CONDITION 346 is not located, the process will be terminated.

Pseudo code S410, determines, based on the boolean values of NAMEARG 348 and DAYSARG 350, in FIG. 3, whether the condition of CONDITION 346 in FIG. 3 requires specific information to be inserted (e.g., the returned condition includes placeholders). If the condition returned by the processor circuit 102 in response to pseudo code S404 requires placeholders to be replaced by a name argument and/or day argument and no arguments are provided, the process will be terminated as indicated at S412. Otherwise, the required name and/or days argument is inserted into the condition returned (based on the values of NAMEARG 348 and DAYSARG 350 returned) and the name and/or day arguments provided during the launch of DB maintenance tool 114 code.

As will be apparent to those of ordinary skill in the art after reviewing this specification in its entirety, alternative embodiments may enable a user of the DB maintenance tool 114 to create specific conditions to be used. This user defined condition selection may include either modifying configuration table 340 or inserting new rows of data into configuration table 340, for example.

Essentially, pseudo-code S414 performs a search of data in the database based on the instructions received at S402 and the condition retrieved from configuration table 340 at S406, to locate data meeting the criteria identified by these instructions and conditions.

Pseudo-code S420 provides that if a no log or a summary log is required (log level is "0" or "1") and the user has elected to follow any delete rules (force option is NO), an attempt to perform a clean up function using the top-down method is made relying upon an assumption that all data affected by the requested cleanup is stored in tables which allow delete cascades to be performed. The cleanup function first constructs a query to delete the desired data from the table specified. This query is generated by pseudo-code S422.

The name and day arguments are then, if required (indicated by boolean values retrieved from NAMEARG 348 and DAYSARG 350), inserted into the query prepared at S422 and the fully prepared query is executed by pseudo-code S424. If this execution results in an error, the transaction is not committed (i.e., the transaction is rolled back) and the code is terminated by pseudo-code S426.

Figure 5A:
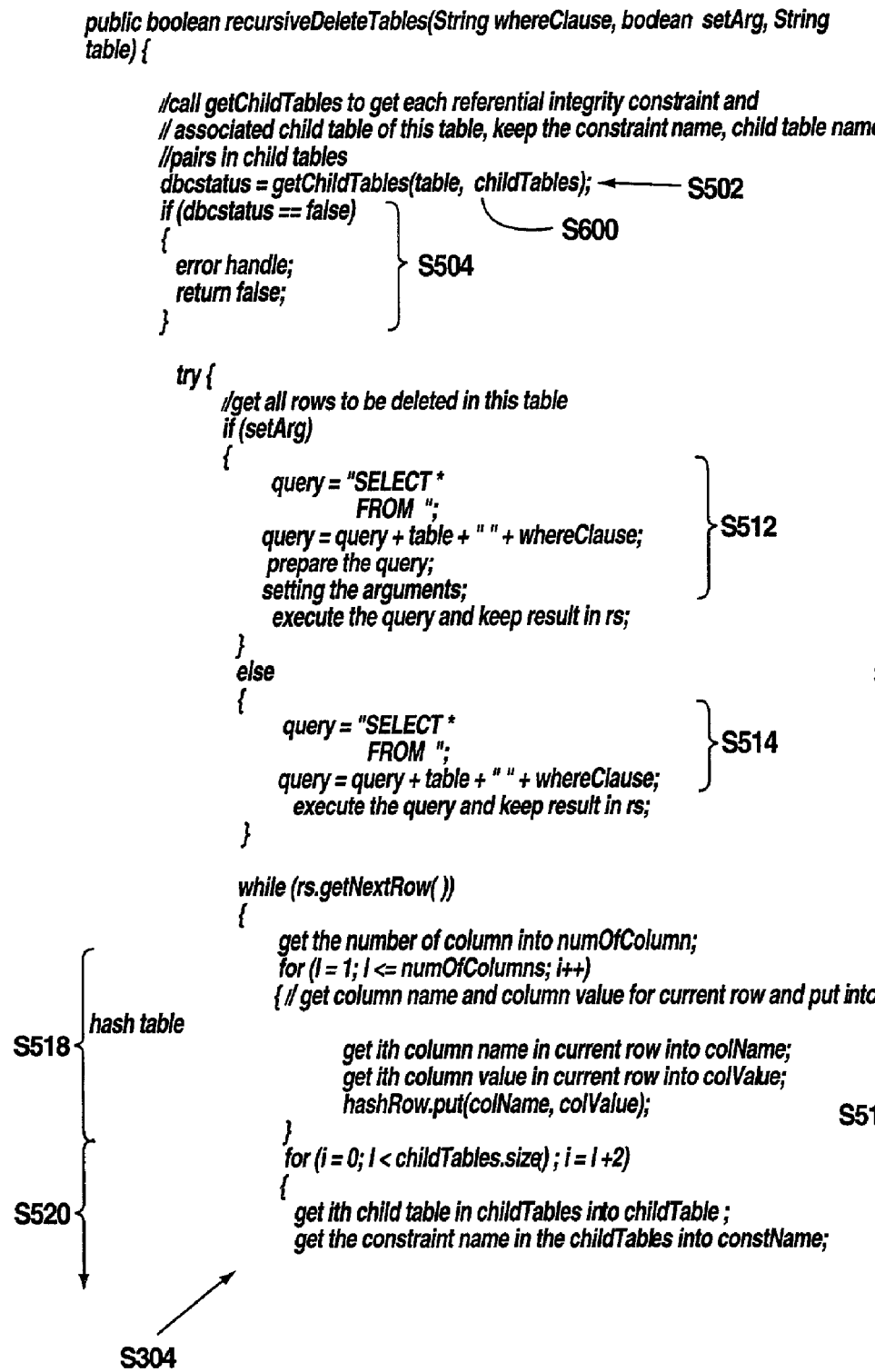

If, in response to pseudo-code S420, it is determined that a detailed log is required (log level is "2") or the user requests that, despite any delete restrict rules, the requested deletion is to be performed (force option is YES), then a bottom up cleanup is attempted by pseudo-code S418. As indicated above, a bottom up approach requires all tables having data meeting the selection criteria to be identified. This identification is performed using a recursive process by calling a recursiveDeleteTables function S304 as shown in FIG. 5A. This function is called by providing the "where-Clause"—a portion of a SQL query—a boolean value of TRUE, and the table that requires cleaning up.

Referring to FIG. 5, the recursiveDeleteTables function S304 is implemented by a first pseudo-code S502 which directs the processor circuit to set a variable, "dbcstatus", to the value of a function call to a getChildTables function shown generally at S600 in FIG. 6. The function getChildTables S600, described in detail below, returns a boolean value and populates an array (identified by the variable "childTables") which stores the name of any children tables and any RI constraint associated with each child table. If the function call to getChildTables fails for any reason, the function returns a value of FALSE and the recursiveDeleteTables function S304 terminates in response to pseudo-code S504. Otherwise the getChildTables function S600 returns a value of TRUE and pseudo-code S506 shown in FIGS. 5A and 5B is executed. Once pseudo-code S506 is performed a TRUE value is returned to the calling statement S418 in FIG. 4 in response to pseudo-code S508 in FIG. 5B.

Pseudo-codes S512 and S514 direct the processor circuit to attempt to identify all the rows that require deletion in the parent table ("table") (S512 or S514). Pseudo-code S512 is executed when the function of pseudo-code S304, recursiveDeleteTables, is called using the top most parent table (identified by calling the function recursiveDeleteTables having the argument "setArg" set to TRUE). Otherwise, operation pseudo-code S514 is executed. Regardless, a query is constructed and executed using the condition identified by the argument "whereclause". The "whereclause" variable indicates the values which are to be located in "table" (e.g., where a customer ="XYZ Inc."). The first time pseudo-code S304 is performed (i.e., for the top most parent table), the "whereclause" variable will be determined by a value retrieved from configuration table 340 in FIG. 3A. In other instances (for child tables), the "whereclause" will be constructed as provided by pseudo-code S522 described in greater detail below, based on the data affected in a child table's direct parent.

Once a query has been constructed by pseudo-code S512 or S514, the query is executed and any returned results (e.g., any rows identified in the "table" using the "whereclause") are stored in an result array identified as "rs".

If "rs" is empty (i.e., no rows in the table were identified as being affected by the proposed cleanup), pseudo-code S516 in FIGS. 5A and 5B is not performed and pseudo-code S304 terminates and returns a TRUE value in response to execution of pseudo-code S508 in FIG. 5B.

If "rs" is not empty (i.e., one or more rows in the tables were identified as being affected by the proposed cleanup to the parent table), a loop defined by pseudo-code S516 is performed once for each row identified and stored in "rs".

A second loop is defined by pseudo-code S518 in FIG. 5A and is performed once for every column in the current row ("numOfColumn") of the loop S516. A hash table identified as "hashRow" is created and the entries stored therein are the name of each column in the current row ("colName") in the loop S516 and the value of each column ("colValue") affected by the proposed cleanup. The values for "colName" and "colValue" are retrieved from the current row in "rs".

Once "hashRow" has been created and the names of every column in "table" together with any associated values are retrieved by the query performed by pseudo-code operation S512/S514, a third loop defined by pseudo-code S520 in FIGS. 5A and 5B is performed. The loop defined by pseudo-code S520 is performed once for every child table stored in array "childTables". While described in greater detail below with reference to FIG. 6, "childTables" is an array of two columns (one for child table names and affected by the proposed cleanup and one for an associated RI constraint associated with the affected child table). As a result of the dimensions of the "childTables" array, the loop defined by pseudo-code S520 creates a counter "i" which, during each pass, is incremented by two. By incrementing "i" by two, the $i^{th}$ value retrieved from array "childTables" will be the name of child table.

For each pass through the loop defined by pseudo-code S520, a child table name and its associated RI constraint will be retrieved from array "childTables" and temporarily stored in variables "childTable" (N.B., no plural) and "constName", respectively.

Based on the values of "childTable" and "constName" a condition clause is generated and stored in "childWhereClause" by calling function constructWhere defined by pseudo-code S700 in FIG. 7 using an argument S522 comprised of the "table", "childTable", "constName" and "hashRow". The constructWhere function defined by pseudo-code S700 is described in greater detail below with reference to FIG. 7.

Additionally, and using the arguments "table", "childTable" and "constName", a variable "deleteRule" is set to the value returned by calling function checkDeleteRule defined by pseudo-code S800 described in greater detail below with reference to FIG. 8. The function checkDeleteRule will return a character value which is set to the delete rule retrieved from the metadata tables 113 maintained by the DB engine 202 shown in FIG. 2.

If the delete rule for the child table identified by "childTable" is delete restrict and the user has selected not to force DB cleanup tool 114 to perform the proposed deletion if a delete restrict rule is encountered (identified by force option NO), pseudo-code 526 returns a FALSE value and the deletion is terminated (and any attempted deletions rolled back). If, however, the delete rule returned in response to pseudo-code S524 is delete set null (described above), then all foreign key values in the child table "childTable" which are related to values in the affected data in the parent table "table" are set to null by pseudo-code S528. Otherwise, in the case of delete cascade, delete restrict or force option set to YES, a further determination needs to be made to identify if the child table "childTable" is the parent to other child tables. This further determination can be made through a further call to the recursiveDeleteTables defined by pseudo-code S304 using the arguments of "childWhereClause" generated in response to pseudo-code S522, FALSE, and "childTable" as provided by pseudo-code S530. In this latter instance, the recursiveDeleteTables function defined by pseudo-code S304 is repeated but using new arguments.

Once the loop defined by pseudo-code S520 has completed for a given row in an array "rs" created by pseudo-code S512/S514 that is, through pseudo-code S520, the lower most child table has been identified through recursion, the recursiveDeleteTables function defined by pseudo-code S304, naming the lower most child table as a parent table will return TRUE as indicated by pseudo-code S508. Consequently, the row should be deleted by pseudo-code S532. As the reverse recursive route is traversed (i.e., from lower most child back to the top most parent table), each table will have its affected data rows deleted. As a result of this operation, data is deleted from the bottom up.

The function getChildTables defined by pseudo-code S600, illustrated in FIG. 6, directs the processor circuit to retrieve for a given parent table (identified as calling argument "parentTable") the table name ("tabname") and RI constraint name ("constname") from the metadata tables 113 shown in FIG. 2 created and maintained by the DB engine 202. If the database being cleaned is a DB2 database, pseudo-code S602 is executed. If the database being cleaned is an Oracle database, then operations S604 are performed. If the database being cleaned is neither a DB2 nor an Oracle database, then, in the exemplary embodiment, the function getChildTables defined by pseudo-code S600 returns a FALSE value S606. In either group of pseudo-code S602/S604, a query is created which is designed to, when executed, identify all the child tables of parent table "parentTable" and their associated RI constraints. When pseudo-code S608 is executed the returned child table names and constraints are temporarily stored as a vector "rs". The values temporarily stored as vector "rs" are then individually retrieved in a loop defined by pseudo-code S616 comprised of pseudo-codes S610, S612 for retrieving from vector "rs" and by pseudo-code S614 for retrieving values stored in vector "childTables".

As described above, constructWhere function defined by pseudo-code S700, is illustrated in FIG. 7, and serves to generates a character string which forms a portion of query that is used by pseudo-code S522 in FIG. 5B to identify all rows, in the given "childTable", that are affected by the proposed cleanup operation. Specifically, the query portion generated by constructWhere function defined by pseudo-code S700 is used as an argument by pseudo-code S530 which calls the recursiveDeleteTables function defined by pseudo-code S304. Thereafter, the argument is used by pseudo-code S512/S514 to select from a parent table (which in this instance is also a child table) all rows affected.

The function defined by pseudo-code S700 includes two main portions defined by pseudo-code S702 and S710. Pseudo-code S702 directs the processor circuit 102 to generate a query portion relevant to a DB2 DBMS while pseudo-code S704 directs the processor to generate a similar query portion relevant to an Oracle DBMS. In view of their similarity (only syntax and metadata table and row names differ appreciably) only pseudo-code S702 is described in detail.

The constructWhere function defined by pseudo-code S700 is called with four identifiers: the table that is affected ("table"); the child table affected ("childTable"); the RI constraint (constName); and a hash table ("row"). The hash table argument is the hash table storing the name of columns affected by the proposed delete in "table" and the value of the current row in loop S516 (see pseudo-code S518 in FIG. 5A). A query is generated which is used to select from the metadata tables 113 in FIG. 2 the number of columns in the primary and foreign keys ("colcount" for a RI constraint) that relate "table" to "childTable" and the names of these foreign and primary key columns ("fk_colnames", "pk_colnames", respectively). When executed (S706), the results of the query are stored in variable "rsl".

For each primary/foreign key pair, a loop defined by pseudo-code S708 is performed to generate "whereClause". In each instance through the loop, the "whereClause" string has concatenated thereto the name of the foreign key column in "childTable" (i.e., the next portion or token in "fk_colnames") is set equal to the value in the corresponding primary key column which has been previously stored in hash table "row". For example, assume there are two columns in the primary/foreign key pair which relate "table" to "childTable". In this instance, "colcount" would be equal to two. Further assume that the foreign key column names in "childTable" are CustomerNameColumn and CustomerCountry. Further assume that the values in hash table "row" that correspond to the primary key column names associated with CustomerNameColumn and CustomerCountry are XYZ and Canada. In this instance, a "whereClause" would be generated that indicates "CustomerNameColumn=XYZ AND CustomerCountry=CANADA". The resulting "whereClause" is used to form a query in pseudo-code S512/S514 shown in FIG. 5A which is used to locate entries in a child table which references to-be-deleted entries in the parent table.

Referring to FIG. 8, the checkDeleteRule function defined by pseudo-code S800 is illustrated in pseudo-code. The checkDeleteRule function is called with arguments identifying the affected parent table ("table"), the affected child table ("childTable") and the name of the constraint ("constName"). The checkDeleteRule function first generates a query to identify the delete rule for the RI constraint which link the parent table "table" to the child table "childTable" under the direction of pseudo-code S802 when using a DB2 DBMS and under the direction of pseudo-code S804 when using an Oracle DBMS. This query is executed and the result passed from a temporary variable ("rs") into the returned variable "deleterule".

From the foregoing description and with reference to the figures, persons of ordinary skill in the art will understand that the described embodiments of the invention will provide a configurable, extensible and adaptable database maintenance tool, DB maintenance tool 114, described herein, will, for a given table to be cleaned up, identify all the child tables referencing data to be deleted from a selected table. The DB maintenance tool 114 will also identify further child tables of the previously identified child tables affected by the proposed deletions from the child tables. This process is repeated (through recursion) until all child tables that may be affected are identified. Additionally, for each child table identified, the RI and delete rules will also be determined by accessing a database's metadata tables. These RI and delete rules are then used (in conjunction with the tables identified) to perform the required database cleanup.

As will be understood by those of ordinary skill in the art, should the DB maintenance tool 114 described herein fail during operation for any result, any portion of the cleanup will not be committed to permanent storage in the database 112. Rather, any transactions performed in DB 112 by the DB maintenance tool 114 will be "rolled back" to ensure a high degree of data integrity.

As will be apparent to those of ordinary skill in the art, operations similar to those performed by the DB maintenance tool 114 described herein could be used to create extensible, adaptable and configurable tools for other types of data functions or deletions such as, for example, to move data between databases, copy and synchronize data between databases and propagate data from one database to a master database.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for deleting data in a database comprising a plurality of families of tables, the method comprising the steps of:
   (a) storing at least one criteria for specifying data to be deleted;
   (b) accessing the at least one criteria;
   (c) identifying tables in a family of tables having data associated with the at least one criteria, the family of tables being stored in a database, wherein each identified table is associated with at least one delete rule, the at least one delete rule being distinct from the at least one criteria and specifying a procedure for deleting data in the respective identified table; and
   (d) performing a delete function on the data associated with the at least one criteria in the identified tables according to the at least one delete rule associated with each of the identified tables.

2. The method of claim 1, further comprising the step of:
   (e) identifying a hierarchical referential relationship in the family of tables.

3. The method of claim 2, wherein the delete function performing step (d) further comprises the step of:
   (d1) deleting data from a table in a lower position in the hierarchical referential relationship prior to deleting data from a table in a higher position in the hierarchical referential relationship.

4. The method of claim 2, wherein step (e) of identifying the hierarchical referential relationship comprises:
   (e1) identifying data in a first table in the family of tables; and
   (e2) identifying data in a second table in the family of tables referencing the data in the first table.

5. The method of claim 2, further comprising the step of:
   (f) identifying records containing the data associated with the at least one criteria in the family of tables.

6. The method of claim 5, wherein the delete function performing (d) comprises the step of:
   (d1) deleting the records from the family of tables.

7. The method of claim 1, further comprising the step of:
   (e) deleting the data associated with the at least one criteria in each of the identified tables when one or more conditions specified by the at least one delete rule associated with the respective identified table are satisfied.

8. The method of claim 1, further comprising the step of:
   (e) identifying the at least one delete rule associated with each of the identified tables holding the data associated with the at least one criteria.

9. The method of claim 8, wherein step (e) of identifying the at least one delete rule comprises the step of:
   (e1) accessing a metadata table of the database.

10. The method of claim 1, further comprising the step of:
    (e) providing an application program, which when executed performs steps (a) through (d).

11. The method of claim 1, further comprising the step of:
    (e) providing a user interface for receiving the at least one criteria from a user.

12. The method of claim 11, further comprising the step of:
    (f) making available to the user at least one condition at least partially defining a criteria and responding to user input for use in conjunction with the at least one condition to define the criteria.

13. A computer readable medium containing program instructions for deleting data in a database, the program instructions for:
    storing at least one criteria for specifying data to be deleted;
    accessing the at least one criteria; identifying tables in a family of tables having data associated with the at least one criteria, the family of tables being stored in a database, wherein each identified table is associated with at least one delete rule, the at least one delete rule being distinct from the at least one criteria and specifying a procedure for deleting data in the respective identified table; and
    performing a delete function on the data associated with the at least one criteria in the identified tables according to the at least one delete rule associated with each of the identified tables.

14. The computer readable medium of claim 13, further comprising the instructions for:
    identifying a hierarchical referential relationship in the family of tables.

15. The computer readable medium of claim 14, wherein the delete function performing instruction further comprises the instruction for:
    deleting data from a table in a lower position in the hierarchical referential relationship prior to deleting data from a table in a higher position in the hierarchical referential relationship.

16. The computer readable medium of claim 14, wherein the instruction of identifying the hierarchical referential relationship comprises:
    identifying data in a first table in the family of tables; and
    identifying data in a second table in the family of tables referencing the data in the first table.

17. The computer readable medium of claim 14, further comprising the instruction for:
    identifying records containing the data associated with the at least one criteria in the family of tables.

18. The computer readable medium of claim 17, wherein the delete function performing instruction further comprises the instruction for:
    deleting the records from the family of tables.

19. The computer readable medium of claim 13, further comprising the instruction for:
    deleting the data associated with the at least one criteria in each of the identified tables when one or more conditions specified by the at least one delete rule associated with the respective identified table are satisfied.

20. The computer readable medium of claim 13, further comprising the instruction for:
    identifying the at lest one delete rule associated with each of the identified tables holding the data associated with the at least one criteria.

21. The computer readable medium of claim 20, wherein the instruction of identifying the at least one delete rule comprises the instruction for:
    accessing a metadata table of the database.

22. An apparatus for removing unwanted data from a database comprising:

means for storing at least one criteria for specifying data to be deleted;

means for accessing the at least one criteria;

means for identifying tables in a family of table having data associated with the at least one criteria, wherein each identified table is associated with at least one delete rule, the at least one delete rule being distinct from the at least one criteria and specifying a procedure for deleting data in the respective identified table; and means for performing a delete function on the data associated with the at least one criteria in the identified tables according to the at least one delete rule associated with each of the identified tables.

23. A computer system comprising:

a processor circuit operable to access a database for storing a plurality of families of tables of data and operable to access delete rules associated with respective tables in the family of tables; and a database maintenance tool which causes the processor circuit to store at least one criteria for specifying data to be deleted, access the at least one criteria, identify tables in a family of tables having data associated with the at least one criteria, wherein each identified table is associated with at least one delete rule, the at least one delete rule being distinct from the at least one criteria and specifying a procedure for deleting data in the respective identified table, and perform a delete function on the data associated with the at least one criteria in the identified tables according to the at least one delete rule associated with each of the identified tables.

24. The computer system of claim 23, wherein the database maintenance tool further causes the processor circuit to identify a hierarchical relationship in the family of tables.

25. The computer system of claim 24, wherein the database maintenance tool causes the processor circuit to:

identify data in a first table in the family of tables; and identity data in a second table in the family of tables referencing the data in the first table.

26. The computer system of claim 23, further Comprising the database.

27. The computer system of claim 26, further comprising a metadata table for storing the delete rules.

28. An apparatus for deleting data in a database, the database comprising tables, the apparatus comprising:

means for storing at least one criteria for specifying data to be deleted;

means for accessing the at least one criteria;

means for identifying a sub-set of tables in the database having data associated with the at least one criteria;

means for identifying delete rules associated with the sub-sets of tables, the delete rules being distinct from the at least one criteria and specifying procedures for deleting data in the sub-set of tables; and means for performing a delete function on the data associated with the at least one criteria from the sub-set of tables according to the delete rules associated with the sub-set of tables.

29. The apparatus of claim 28, wherein the means for identifying the sub-set of tables comprises a processing circuit adapted to:

receive a criteria definition for identifying a portion of the data in the database; and identify, in the sub-set of tables, data corresponding to the portion of the data in the database.

* * * * *